Figure 1:
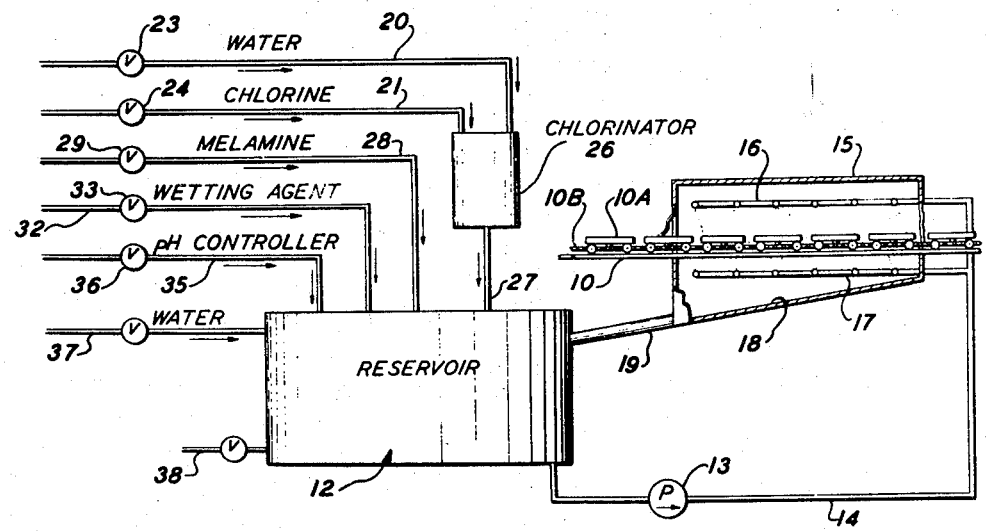

Nov. 28, 1950

D. E. PRYOR ET AL 2,531,463

TREATMENT OF FRUITS AND VEGETABLES

Filed July 2, 1948

INVENTOR.
DEAN E. PRYOR
JOHN C. BAKER

BY

*James B Christie*

ATTORNEY

Patented Nov. 28, 1950

2,531,463

UNITED STATES PATENT OFFICE 2,531,463

TREATMENT OF FRUITS AND VEGETABLES

Dean Earl Pryor, Whittier, and John Clark Baker, Monrovia, Calif., assignors to Wallace & Tiernan Products Corporation, Belleville, N. J., a corporation of New Jersey Application July 2, 1948, Serial No. 36,584

18 Claims. (Cl. 99—154)

This invention relates to the treatment of raw fruits and vegetables to inhibit decay during shipment and storage and provides improvements to this end. More specifically, the invention provides an improved treatment directed to the prevention of fungal and bacterial decay.

Fungal decay of various fruits and vegetables is exemplified by "pink rot" (particularly on celery) or "watery soft rot," the latter being another manifestation of the fungus responsible for the pink rot and found on many fruits and vegetables. Pink rot, the name being derived from the discoloration of the host tissue, is caused by various Sclerotinia species as for example the species *Sclerotina sclerotium*. The disease in this form is soil born and is found in substantially every state in the Union, being particularly prevalent in the celery growing centers of California and Florida.

Pink rot is a soil transmitted disease, overwintering by means of sclerotia which take the form of flat oval patches on the surface of the diseased plant. These sclerotia may, under proper conditions, germinate directly to form mycelium which generally infects roots and lower stalks imparting a pink color to the diseased host. Alternatively the sclerotia may send up apothecia; tube like projections terminating in cup like apothecium. The apothecium contains countless ascospores which, when released, infect the top of the host plant and neighboring plants to form the well known watery soft rot characterized by a yellow appearance and exudation of water.

The pink rot or watery soft rot is normally spread in the field through the medium of infected cutting knives, contaminated soil, etc., or by the wind-born ascospores. In addition, either form of the disease may be spread during storage and handling by simple contact of healthy fruits or vegetables with diseased ones. The early forms of the disease thus transmitted are difficult to detect, so that it is impossible or at least impracticable to insure complete separation of the diseased and healthy produce. Recently several carloads of apparently healthy celery were found to have become completely infected with watery soft rot during shipment between the West Coast and Chicago.

Perhaps the most costly disease from the standpoint of loss during storage and handling is the so-called bacterial soft rot caused by bacteria of the type *Erwinia carotavora*. This infection enters the plant tissue through bruises and wounds and for this reason most commonly appears during and after harvest when the vegetables or fruit are bruised through handling.

We have discovered that both bacterial and fungal decay of fruits and vegetables are inhibited by treatment with solutions containing both free chlorine, either as chlorine per se or hydrolized to hypochlorous acid, and chlorinated organic amino compounds. The solution may be prepared by chlorinating the parent organic amino compound in situ, employing chlorine in excess so that the presence of free chlorine is assured. The chlorination of some of the suitable organic amino compounds is relatively slow, so that in some cases, free unchlorinated organic amino compound may also be present.

In the practice of the invention chlorine is consumed. Some of the chlorine is consumed directly, possibly through attack on bacteria, and some is apparently consumed because the chloroamine gives up its chlorine, possibly in its attack on fungi. The remaining amino compound is regenerated to chloro-amine through reaction with excess chlorine.

As noted above, the action of the chlorinated amino compounds is not clearly understood. It is thought that they may function, as such, in attacking the fungi or they may act as carriers for the chlorine which may split off the parent compound to attack the fungus with greater efficiency than the "free" chlorine in the solution. In other words the parent compound may be a vehicle which by reason of molecular size, surface characteristics or the like serves to direct the loosely bound chlorine against the fungus. In any event it appears that the chloro-amino compound loses at least a part of its chlorine during the treating. To provide an effective continuous treating process therefore, it is necessary to replace the lost chlorine to reform the chloro derivative.

Many fruits and vegetables are normally washed prior to shipment. This washing is accomplished either by passing the produce through a tank of wash water or by spraying wash water thereover, the particular method employed depending generally upon the character of the plant. Thus the highly foliated vegetables such as celery, for example, are generally washed by spraying whereas the smoother surfaced vegetables or fruits such as tomatoes and lemons are generally washed by dipping in a tank of wash water. In this washing step the wash water may be refrigerated so as to partially refrigerate the vegetable or fruit being washed.

In accordance with the present invention, we accomplish the destruction of any incipient bacterial or fungal decay in the washing process. The fruits or vegetables preferably are treated by including in the washing solution from about 10 to 400 parts per million of chlorine, approximately 10% to 50% of which is present as free chlorine and the remainder in the form of a chlorinated organic amino compound. Many fruits and vegetables are best treated employing 10 to 100 parts of chlorine per million, but others, for example spinach and canteloupes, will tolerate concentrations as high as 400 parts per million of chlorine. The total chlorine content is controlled within the range indicated depending upon the type of vegetable or fruit being treated and the particular type of decay to be inhibited. Similarly the proportion of free chlorine to combined chlorine is controlled with reference to the relative proportion of bacterial and fungal decay encountered and to the tolerance of the fruits or vegetables being treated. As the proportion of bacterial decay increases the proportion of free chlorine to total chlorine is correspondingly increased. In most cases however, a preferred range of total chlorine is between about 25 to 75 parts per million of which less than one-half is present as free chlorine.

The preferred treating temperature (i. e. that of the wash) is in the range of about 32° F. to about the temperature of tap water. Hydrogen ion concentrations may be varied as desired, but in general the pH is that of the tap water.

Since at least some chlorine splits off of the parent chloro-amine compound in the sterilization process, it is necessary in a continuous operation to replace the lost chlorine in situ so as to maintain the proper concentration of combined chlorine. Regeneration of the chloro-amino compound is accomplished by the addition to the solution of sufficient free chlorine to maintain the proportion of free chlorine in the solution at the desired level and also to react with the organic compound to replace the chlorine lost therefrom during the process.

In effect, we have provided a regenerative system wherein chloro-amino compounds lose combined chlorine in the process of destroying decay producers and the chlorine thus lost is replaced by reaction with free chlorine in the solution. It is not definitely known whether all of the N-chloro compounds formed in the solution are in dynamic equilibrium with the free chlorine. It is possible that some of the desirable N-chloro compounds are in static rather than dynamic equilibrium. If such be the case the statistical probability of the presence of compounds of this latter type will vary according to the parent amino compound or compounds employed. In any case there will be present some N-chloro compounds which are in dynamic equilibrium with the solution chlorine and for this reason the process of the invention may be characterized as a dynamic regenerative system.

Chlorine is lost from the solution in several ways. A certain amount of chlorine, along with a proportionate amount of N-chloro amine, is lost along with the water retained on the wet vegetables or fruits. Additional chlorine is lost through reaction with proteins or other compounds in the vegetable or fruit or with organic organisms in the water itself or with soil organic matter. Moreover, the chlorinated organic compound loses some of its chlorine in destroying decay producers. For this reason, it is necessary to add make-up chlorine to the solution. It is also desirable to continuously add additional quantities of the amino parent compound to make up for loss by entrainment, solution overflow, or by reaction with the vegetable or fruit. However, a very small amount of the amino compound is lost in comparison to the loss of chlorine itself and the quantities added are therefore comparatively small.

It is the preferred practice, for reasons of economy in terms of water and chemicals, to circulate the treatment solutions and to regenerate the chlorinated amino compounds by introduction of chlorine. However, such circulation is not essential to the invention in its broader aspects and, if desired, the treatment solutions may be discarded after a single washing.

A system for carrying out the regenerative process of the invention is shown diagrammatically in Fig. 1 of the accompanying drawing. For purposes of description of the process it will be assumed that the vegetable to be treated is celery, since celery is highly susceptible to the two kinds of decay here under consideration.

In the washing process, celery is carried along a track 10 on a plurality of cars 10A linked together and propelled by a chain 10B. The cars are conventionally perforated metal plates, screen or the like. Wash water, which may be partially refrigerated, is withdrawn from a reservoir or storage tank 12 and pumped by a pump 13 through a line 14 into a washing chamber 15 through which the celery cars travel. The washing chamber encloses a plurality of spray heads, 16, 17 directed downwardly and upwardly against the celery lying in the cars. Solution from the reservoir is forced through the spray heads and drains from the celery into a trough 18 forming a part of the wash chamber. The water is returned by gravity flow through a line 19 to the reservoir.

Makeup water and chlorine are added to the solution in the reservoir through lines 20, 21 controlled respectively by valves 23, 24 and are preferably premixed in a chlorinator 26 prior to introduction through line 27 to the reservoir. Makeup amine, as a concentrated aqueous solution or as a dry powder is added to the reservoir through a line 28 controlled by a valve 29.

To improve the contact between the treating solution and the vegetable or fruit, a wetting agent such as sulfonated kerosene or any other substantially non-toxic compatible wetting agent may be incorporated in the solution and makeup amounts may be added through a line 32 controlled by a valve 33.

There are several factors to consider in determining optimum hydrogen ion concentration for the treatment solution. These are as follows:

1. *Economy.*—Generally speaking, the pH obtainable with the particular tap water available is the most economical, since this does not involve the addition of acids, bases or buffers.

2. *Formation and regeneration of the particular N-chloro compound involved.*—Many reactions to form N-chloro compounds proceed best at pH values in the neighborhood of 4 to 5. In many cases the pH may be as low as 1, or even more acid, without interfering with chlorination. On the other hand, as pH number increases, conditions for the formation of N-chloro compounds generally become less favorable. There are only a few cases where pH can go above 6 without interfering with the reaction, and it is a rare case in which chloramine formation can be carried out at pH 9.

The formation of the N-chloro compound for the original treating solution can be carried out at optimum pH in a concentrated solution with subsequent dilution and pH adjustment into a range which is optimum for fruit treatment. Regeneration in the treatment solution is less dependent upon pH, since in general there is ample time for regeneration and it may occur at adequate speed even though the pH in the treatment solution is not optimum for the formation of the particular N-chloro compound.

3. *Tolerance of the particular fruit or vegetable.*—Generally speaking, solutions in the pH range of say 6 to 9, are least likely to cause injury to fruits and vegetables. Some fruits and vegetables can tolerate solutions having a pH as low as 4.

4. *Chlorine activity.*—Free chlorine appears to be most active in its attack on bacteria in the pH range of 4 to 6, and is relatively inactive at pH's above 9.

Bearing all of these considerations in mind, treatment solutions for the practice of the invention should be held in the pH range of 4 to 9, with the lower end of the range being preferred for fruits and vegetables which can tolerate it. In most instances, no particular pH adjustment is required, and that obtainable with the particular tap water available is satisfactory. The upper end of the range is preferred from an economic standpoint.

The water itself or the dirt contained on the produce being treated usually contains compounds which exert a sufficient buffering action to maintain the pH of the treating solution substantially constant. However, in the absence of such inherent buffering action it may be necessary to add a buffer to the solution to control the pH within the desired range. Such a buffer or even a small amount of acid or base may be added through a line 35 controlled by a valve 36. These substances may also be added in admixture with the amino compound. An auxiliary water inlet line 37 provides alternative means for adding water and a drain 38 provides means for removing accumulated dirt, etc., from the reservoir.

The preferred source of chlorine is gaseous chlorine. However we have also found that both the free chlorine and the regenerative chlorine may be derived from a hypochlorite solution. In general hypochlorite solutions will fall within a pH range of 6 to 9. If the hypochlorite solution causes the wash bath to exceed a pH of 9, a small amount of acid may be added to re-establish the desired pH.

In the process three alternative procedures may be employed. In one a sufficient amount of organic nitrogen compound and chlorine are added to the reservoir to form the desired amount of chlorinated material. In this process it may be desirable (particularly if melamine is employed as the parent amine) to wait after charging the reservoir for a period to provide time for the reaction of the chlorine with the amino compound. The length of the period will vary from say 5 minutes to several depending upon concentration of the reactants, the type of compound and the pH. The lower the concentration, the longer the reaction time. However, many amino compounds react instantaneously with chlorine and for these no waiting period is required. In other cases, the presence of free amine may be tolerated or even desirable and again no waiting period is required.

In a second method a chlorinated amine and the required amount of free chlorine may be added directly to the reservoir. In this method no waiting period is required.

In a third method an amino compound is fed directly into a strong chlorine solution in a separate vessel. A residence time may be required in the separate vessel to permit the reaction of the chlorine with the nitrogen compound. Thereafter the resulting solution containing the chlorinated nitrogen compound and the excess chlorine is fed to the system, or the excess chlorine may be added separately. This procedure reduces reaction time. It may be necessary to add a small amount of alkali to the reaction vessel to maintain a pH at which the chlorination of the particular amine will take place. As indicated above, many amines will react with chlorine at a very low pH level, in which case the foregoing precaution is unnecessary.

In starting any of the processes some time can be saved by charging initially with the chlorinated compound.

Figure 2:
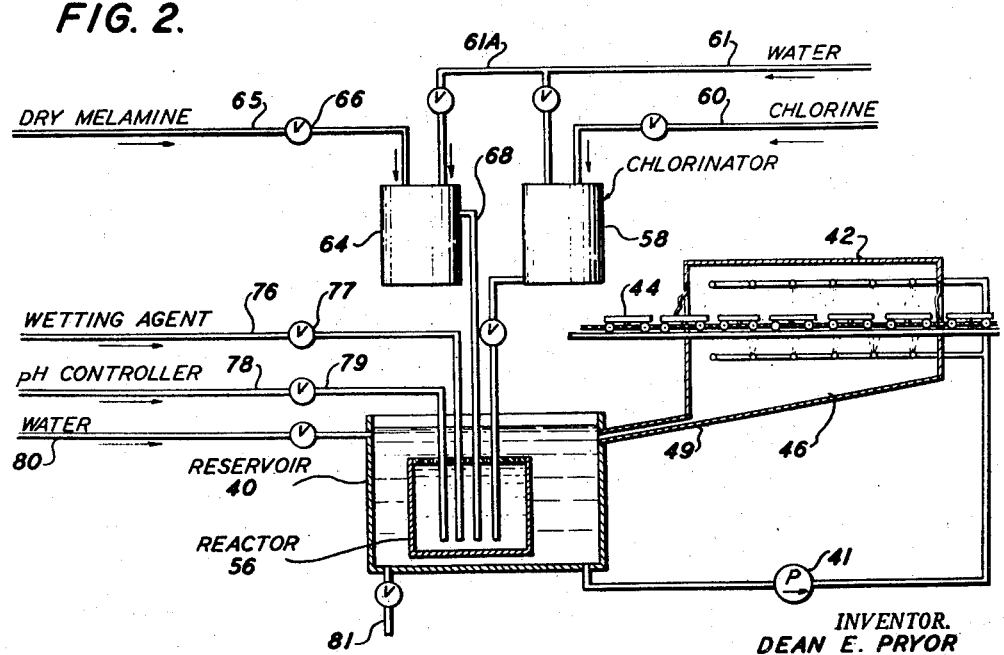

A flow chart of apparatus for carrying out the third procedure is shown in Fig. 2. Treating solution is pumped from a reservoir 40 by a pump 41 into a wash chamber 42 and over the vegetable or fruit traveling through the chamber on a conveying system 44. The wash chamber and conveying system were discussed with reference to Fig. 1. The solution draining from the fruit is collected in a trough 46 and returns by gravity flow through a line 49 to the reservoir 40. The system in this case is charged by forming a chlorine solution in a chlorinator 58 to which chlorine and water are added through lines 60, 61 respectively. The solution formed in the chlorinator 58 is fed into a reactor 56. Melamine or other suitable amino compound and water are introduced into a solution drum 64 through lines 65, 66 respectively, and the aqueous solution of the chlorine compound formed therein is fed through line 68 into the reactor 56.

The flow of chlorine and melamine solutions into the reactor 56 is governed to allow a residence time within the reactor 56 that is long enough to permit the reaction of the chlorine with the parent compound. This reaction period may be appreciable, say half an hour or may be negligible depending on the nature of the parent compound. The liquid product flows out the top of the reactor into the reservoir, or the reaction chamber may be externally disposed in which case an additional feed line is required. Wetting agent may be added through a line 76 controlled by a valve 77 and pH controller, if required, may be added through line 78 controlled by a valve 79. It may be necessary to add a small amount of alkali to the reactor to raise the pH to a level at which the chlorination will take place. As in the foregoing system an additional water line 80 and a drain 81 are provided.

During the course of the washing treatment, makeup amounts of chlorine are added to maintain the desired free chlorine content and to replace any chlorine which splits off the chlorinated amine in the process and is consumed. Also small amounts of makeup amine may be required to compensate for that lost by entrainment. These incremental amounts of amine are chlorinated in reactor 56 before passing into the circulating system.

In the practice of the invention, a variety of organic amino compounds may be employed. These compounds react with a portion of the chlorine to bind it up in a form which is nonvolatile but still active. In theory the operation or effect, from a chemical point of view is believed to be about as follows:

An amino compound having the formula RNH₂ may react with chlorine to form a so-called n-chloro compound having the formula RNHCl or RNCl₂. The nitrogen in such RNH₂ compounds is trivalent and bonded directly either to a carbon or to a sulfur atom and also has at least one hydrogen atom directly bonded thereto, which is replaceable rapidly by chlorine, to form the so-called n-chloro compound. If there is a stoichiometric excess of free chlorine, the reaction will be driven toward completion, i. e. toward the chlorination of all the amine. With parent amines which react slowly with chlorine, of which group melamine is an example, it is not necessary to provide a stoichiometric excess of free chlorine provided that there is sufficient unreacted chlorine to satisfy the requirements given above.

It appears that the three most important characteristics of nitrogen compounds useful in the practice of the invention are:

1. A sufficient solubility to permit the preparation of a solution having from about 15 to about 80 parts per million of chlorine present as an n-chloro compound;

2. A sufficiently low volatility to prevent an excessive loss through evaporation or aeration; and 3. Resistance to spontaneous chemical decomposition which if excessive will render the amino compound inoperable in the process. Further considerations, such as the toxicity, corrosiveness, stability towards hydrolyses, and speed of reaction with chlorine are less important.

The preferred amino compounds in accordance with the invention are the amines, amides and imides and substitution products thereof. The most effective members of this generic category are classified below and several specific compounds are listed by way of example in each class.

(1) One class of operable amino compounds is the aromatic sulfonamides having the general empirical formula $R_1 \cdot C_6H \cdot SO_2 \cdot NH \cdot R_2$ in which $R_1$ is either a hydrogen atom or an alkyl group and $R_2$ is either a hydrogen atom or alkyl group of no more than 6 carbon atoms. As the alkyl groups get larger, the solubility of the compound decreases and for most purposes the compounds in which $R_2$ is methyl or hydrogen are the only ones which exhibit sufficient solubility over the operable pH range. If the alkyl group is omitted, the compounds are sufficiently soluble in solution of pH 6 or higher. In cases where the requirement of n-chloro compound is relatively small, i. e. where the bacterial rot overshadows the fungal rot, the solubility of these compounds at lower pH's will be sufficient. Examples of members of this class are benzene sulfonamide, toluene sulfonamide, or N-alkyl derivatives of either of these. For example toluene sulfonamide will form p-toluene sulphachloramine in the presence of free chlorine at more or less alkaline pH. If the pH of the solution is too low, i. e. below 6, dichloro toluene sulfonamide will be formed in the presence of free chlorine. The solubility of this compound is such as to provide only the minimum requirement of combined chlorine, i. e. approximately 15 parts per million.

(2) A second class, somewhat related to the first, is the N-acyl derivatives of aromatic sulfonamides. An example of this class is N-acetyl toluene sulfonamide. In general these compounds are more soluble than those of group 1 and are thus not limited in operability.

(3) Another group of staisfactory amino compounds includes the N-alkyl and N-acyl aliphatic sulfonamides having empirical formula $$R_1 \cdot SO_2 \cdot NH \cdot R_2$$

and $R_1-C^{=0} \cdot SO_2 \cdot NH \cdot R_2$ respectively where $R_1$ is an alkyl group and $R_2$ is either a hydrogen atom or an alkyl group of six carbon atoms or less. The limitation on the size of the $R_2$ alkyl group is to insure a sufficient solubility of the compound selected. Examples of this class of compounds are N-methyl methane sulfonamide and N-acetyl methane sulfonamide.

(4) A fourth group of compounds suitable for the process of the invention is the amino derivatives of cyanuric acid such as melamine, hydroxymelamines, alkyl or acyl substituted melamines or salts thereof, dicyandiamide and the like. One of the preferred compounds for the practice of the invention is melamine which, in the presence of free chlorine forms one or more chloromelamines such as trichloromelamine, etc., which are active fungicides.

(5) Still another class of satisfactory compounds is the imides such as succinimide, phthalamide and the like. In general these compounds are less effective in the process of the invention than are the compounds of the foregoing classes.

(6) Additionally the secondary amines such as dimethylamine, diethylamine and the like are satisfactory to a lesser degree than the compounds identified above.

It is of course impossible to state without exceptions that all compounds not falling within any of the above groups are unsatisfactory. However, we have found that compounds as classified above are preferred.

The dichloro or polychloro derivatives of the compounds in any of the above classes may, insofas as solubility permits, be employed. Thus, we may form in the solution a toluene sulfadichloramine and halazone (dichlorosulphonamidobenzoic acid) or the like. In fact, the preferred compound, i. e. chloro-melamine, is probably a mixture of mono-, di-, tri-chloro or higher derivatives.

As is apparent from the foregoing discussion substantially any amino compound having sufficient solubility to produce the chlorine content indicated, a sufficiently low volatility to prevent evaporation and which is sufficiently stable with respect to spontaneous chemical decomposition, is satisfactory for purposes of this invention. However, we have found that certain of these compounds are superior to others. Among the preferred group are melamine, amelamine, and toluene sulphonamide.

We have found that best results are obtained in the treatment of celery, but other vegetables and fruits such as the crucifers (cabbage, broccoli and Brussels sprouts, etc.) green beans, carrots, tomatoes, bell peppers, apples, citrus and peaches also respond to the treatment.

The invention is directed primarily to a process for treating fruits and vegetables with a solution containing both free chlorine and chlorine bound up in an N-chloro amino compound for inhibiting incipient fungal and bacterial decay. However, we have also found that the prevention of fungal decay (in the absence of bacterial decay) is improved by treating the fruit or vegetable with a solution containing an N-chloro amino compound in the absence of free chlorine when the N-chlor compound is formed and regenerated in situ. In such application any of the amino compounds previously identified may be employed and free chlorine may be added in substantially stoichiometric amounts to form the N-chloro derivative and to replace chlorine split off from the chloroamine in the attack on the fungus. For this purpose the chlorine concentration of the solution in terms of chlorine bound up in an N-chloro amino compound may be from about 10 to about 100 parts per million parts of solution.

Practical applications of the invention to the treatment of asparagus and celery are as follows:

Three parts by weight of melamine are reacted with about 5 parts by weight of chlorine in concentrated solution in the presence of about 5 parts by weight of calcium hydroxide. Chlorine concentration in the reaction vessel is in the range of 800 to 1200 P. P. M. and the reaction time is five to seven minutes. The resulting solution is diluted to give a total available chlorine concentration of 50 to 60 P. P. M. of which 5% to 15% is free. The solution also contains some free melamine, the balance probably being largely combined as trichloromelamine.

The diluted solution is brought into contact with the celery at tap water temperature for 30 seconds to 2 minutes.

In treating asparagus the dilute solution is kept in contact with the vegetable for 12 to 20 minutes at hydrocooler temperature, i. e. about 37° F.

We claim:

1. In the treatment of fresh fruits and vegetables to inhibit bacterial and fungal decay, the improvements which comprises washing the surface thereof in an aqueous solution containing from about 10 to 400 parts per million of total chlorine, less than 50% of the total chlorine being present in the form of free chlorine and the remainder of the total chlorine being present in the form of an N-chloro amine.

2. In the treatment of fresh fruits and vegetables to inhibit bacterial and fungal decay, the improvement which comprises washing the surface thereof in a circulating aqueous solution having a chlorine concentration in the range of about 10 to 400 parts per million, less than 50% of the total chlorine concentration being present as free chlorine and the remainder in the form of a N-chloro amine.

3. In the treatment of fresh fruits and vegetables to inhibit bacterial and fungal decay, the improvement which comprises washing the surface thereof in an aqueous solution, maintaining a chlorine concentration in the aqueous solution of approximately 10 to 100 parts per million by the addition of gaseous chlorine, less than 50% of the total chlorine being in the form of free chlorine and the remainder in the form of N-chloro amine.

4. The treatment of fresh fruits and vegetables according to claim 3 wherein the pH of the solution is maintained in the range between 4 and 9.

5. In the treatment of fresh fruits and vegetables to inhibit bacterial and fungal decay, the improvement which comprises washing the surface thereof in a circulating aqueous solution having a pH in the range of about 6 to 9 and containing from about 10 to about 100 parts per million of chlorine, part of the total chlorine being present as free chlorine and the remainder of the total chlorine being present as an n-chloro amine, the chlorine concentration being maintained in the solution by the addition thereto of free chlorine, and the part of the chlorine present as free chlorine being less than half of the total chlorine.

6. A process according to claim 5 wherein the treating solution contains a wetting agent.

7. A process according to claim 5 in which the surface of the product is washed with the solution for about 30 seconds to about 20 minutes.

8. A process for the treatment of fruits and vegetables prior to shipment and storage for the preservation thereof against bacterial and fungal decay which comprises contacting the produce with an aqueous solution containing from about 10 to about 100 parts per million of chlorine, part but less than half of the total chlorine being present in the solution as free chlorine and the remainder of the total chlorine being present in the solution as an n-chloro amine, maintaining the concentration of free chlorine and chloroamine by the addition to the solution of free chlorine, and maintaining the pH of the solution between about 4 and about 9.0.

9. A process according to claim 8 in which a wetting agent is added to the solution.

10. A composition of matter for the treatment of fresh fruits and vegetables to inhibit bacterial and fungal decay which comprises an aqueous solution containing from about 10 to about 100 parts per million of chlorine, less than 50% of the total chlorine being present as free chlorine, the remainder of the total chlorine being present as a N-chloro amino compound, the solution having a pH in the range of about 4 to about 9.

11. A composition of matter according to claim 10 wherein the N-chloro amino compound is chloromelamine.

12. A composition of matter according to claim 10 wherein the N-chloro amino compound is toluene sulfonamide.

13. A composition of matter for the treatment of fresh fruits and vegetables to inhibit bacterial and fungal decay which comprises an aqueous solution containing from about 10 to about 100 parts per million of chlorine, approximately 20% of the total chlorine being present as free chlorine, the remainder of the total chlorine being present as an N-chloro amine, the solution having a pH in the range of about 4 to about 9.

14. A process for treating fruits and vegetables to inhibit bacterial and fungal decay which comprises the steps of adding to a volume of water a concentrated solution of chlorine in water, an organic amino compound, and a wetting agent, the concentrated solution of chlorine in water and the organic amino compound being added to the volume of water so as to produce a solution having from about 20 to about 100 parts per million of total chlorine in which less than 50% of the total chlorine is in the form of free chlorine and the remainder is in the form of an N-chloro amine, circulating the solution thus formed to contact the fruits and vegetables, and adding free chlorine to the solution to maintain the amine in the chlorinated form and to control the proportion of free chlorine to total chlorine.

15. A process according to claim 14 wherein approximately 20% of the total chlorine is present as free chlorine.

16. In the treatment of fresh fruits and vegetables to inhibit bacterial and fungal decay, the improvement which comprises washing the surface thereof in an aqueous solution containing from about 10 to about 100 parts per million of chlorine in the form of an N-chloro amino compound and replacing the chlorine splitting off from the N-chloro amino compound by adding free chlorine to the solution in substantially stoichiometric amounts.

17. In treating fruit and vegetable produce to inhibit bacterial and fungal decay the improvement which comprises treating the produce with an aqueous solution containing a low concentration of an N-chloro amino and adding chlorine to the solution to maintain a free chlorine concentration in the solution in excess of that normally in equilibrium with the chloro amine.

18. In treating fruit and vegetable produce to inhibit bacterial and fungal decay the improvement which comprises treating the produce with an aqueous solution containing a low concentration of an N-chloro amine, adding chlorine to the solution to maintain a free chlorine concentration in the solution in excess of that normally in equilibrium with the chloro amine and regenerating the chlorinated amine in situ by reaction between the amine and chlorine.

DEAN EARL PRYOR.
JOHN CLARK BAKER.

REFERENCES CITED

The following references are of record in the file of this patent:

UNITED STATES PATENTS

| Number | Name | Date |
| --- | --- | --- |
| 2,126,958 | Guha | Aug. 16, 1938 |
| 2,332,151 | Kalmar | Oct. 19, 1943 |

FOREIGN PATENTS

| Number | Country | Date |
| --- | --- | --- |
| 58,194 | Netherlands | Aug. 15, 1946 |

OTHER REFERENCES

Charlton et al.: "Iowa State College of Agriculture and Mechanic Arts Engineering Experiment Station," Bulletin No. 132, March 1937, pages 23 and 24.